United States Patent
Fortenberry

(10) Patent No.: US 7,841,522 B2
(45) Date of Patent: Nov. 30, 2010

(54) APPARATUS, SYSTEM, AND METHOD FOR MEASURING LIGHT-WEIGHT PURCHASE ITEMS

(75) Inventor: Robert Scott Fortenberry, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1022 days.

(21) Appl. No.: 11/564,258

(22) Filed: Nov. 28, 2006

(65) Prior Publication Data

US 2008/0121702 A1 May 29, 2008

(51) Int. Cl.
*G06K 15/00* (2006.01)
(52) U.S. Cl. .................... 235/383; 235/375; 235/380; 705/23
(58) Field of Classification Search .............. 235/383, 235/375, 380; 705/16, 23
See application file for complete search history.

(56) References Cited

U.S. PATENT DOCUMENTS

| | | | | |
|---|---|---|---|---|
| 4,108,363 A * | 8/1978 | Susumu | ...................... | 235/383 |
| 5,040,636 A | 8/1991 | Forsythe et al. | ............... | 186/61 |
| 5,965,861 A * | 10/1999 | Addy et al. | .................. | 235/383 |
| 5,987,428 A * | 11/1999 | Walter | .......................... | 705/23 |
| 5,992,570 A * | 11/1999 | Walter et al. | ................... | 186/36 |
| 6,056,087 A * | 5/2000 | Addy et al. | .................... | 186/61 |
| 6,145,629 A * | 11/2000 | Addy | .......................... | 186/61 |
| 6,155,486 A * | 12/2000 | Lutz | ............................ | 235/383 |
| 6,189,790 B1 * | 2/2001 | Walter | .......................... | 235/383 |
| 6,382,357 B1 * | 5/2002 | Morrison et al. | .............. | 186/61 |
| 6,386,448 B1 * | 5/2002 | Addy | .......................... | 235/383 |
| 6,550,583 B1 | 4/2003 | Brenhouse | ................... | 186/66 |
| 6,779,722 B1 * | 8/2004 | Mason | ........................ | 235/383 |
| 6,794,586 B1 * | 9/2004 | Mason | ..................... | 177/25.15 |
| 7,040,455 B2 * | 5/2006 | Bogat | ........................... | 186/61 |
| 7,114,611 B2 * | 10/2006 | Dickover et al. | ............. | 198/560 |
| 7,255,200 B1 * | 8/2007 | Walter | ......................... | 186/64 |
| 7,337,960 B2 * | 3/2008 | Ostrowski et al. | ............ | 235/383 |
| 7,387,241 B2 * | 6/2008 | Hassenbuerger | ............ | 235/383 |
| 2002/0096564 A1 * | 7/2002 | Bellis et al. | ................. | 235/383 |
| 2002/0112940 A1 * | 8/2002 | Dickover et al. | ............. | 198/835 |
| 2002/0123932 A1 * | 9/2002 | Brenhouse | .................... | 705/16 |
| 2002/0194074 A1 * | 12/2002 | Jacobs | .......................... | 705/16 |
| 2003/0047387 A1 * | 3/2003 | Bogat | ........................... | 186/59 |
| 2003/0120547 A1 * | 6/2003 | Walter et al. | ................... | 705/16 |
| 2003/0121974 A1 * | 7/2003 | Blanford et al. | ............. | 235/383 |
| 2003/0122667 A1 * | 7/2003 | Flynn | .......................... | 340/540 |
| 2005/0061634 A1 * | 3/2005 | Dickover et al. | ............. | 198/835 |
| 2006/0080177 A1 * | 4/2006 | Walter et al. | ................... | 705/23 |
| 2006/0185935 A1 * | 8/2006 | Tashiro | ........................ | 186/61 |
| 2006/0185936 A1 * | 8/2006 | Kaneko | ........................ | 186/61 |
| 2006/0261157 A1 * | 11/2006 | Ostrowski et al. | ........... | 235/383 |

* cited by examiner

*Primary Examiner*—Daniel A Hess
*Assistant Examiner*—Paultep Savusdiphol
(74) *Attorney, Agent, or Firm*—Kunzler Needham Massey & Thorpe

(57) ABSTRACT

An apparatus, system, and method are disclosed for measuring purchase items. An identification module identifies a purchase item conforming to a specified characteristic. A communication module directs the customer to place the purchase item in an auxiliary receptacle in response to the purchase item conforming to the specified characteristic. A measurement module measures the parameter for the purchase item when placed in the auxiliary receptacle. In one embodiment, a verification module verifies that the measured parameter is substantially equivalent to an expected parameter for the purchase item. In a certain embodiment a notification module communicates a security notification in the response to the measured parameter not being substantially equivalent to the expected parameter.

20 Claims, 6 Drawing Sheets

APPARATUS, SYSTEM, AND METHOD FOR MEASURING LIGHT-WEIGHT PURCHASE ITEMS

BACKGROUND OF THE INVENTION

1. Field of the Invention

This invention relates to measuring purchase items and more particularly relates to measuring purchase items with difficult to distinguish characteristics.

2. Description of the Related Art

Scan and bag self-checkout systems are often used to allow customers to pay for purchase items with little or no intervention from retail or store personnel. As used herein, scan and bag self-checkout systems are referred to as self-checkout systems. A customer may bring purchase items to the self-checkout system and scan each purchase item using a bar code scanner, radio frequency identifier (RFID) scanner, or the like. The customer may also place each purchase item in a bag for transporting the purchase items.

Because the customer scans his own purchase item, there is the possibility that the customer may fraudulently scan a first purchase item but actually place a second more costly purchase item in the bag. Alternatively, the customer may fraudulently or unintentionally place an un-scanned purchase item in the bag, scan a purchase item with an incorrect bar code, RFID, or the like, and/or otherwise check out purchase items that are not scanned or paid for.

Self-checkout systems may employ a scale to verify the identity of check out purchase items. For example, the self-checkout system may direct the customer to place each scanned purchase item in a bag. The bag may be in operable communication with a security scale platter that weighs the bag and the bag's contents.

For example, the security scale platter may measure the weight of the bag and the bag's contents as purchase items are added to the bag one by one. The self-checkout system may verify that each increase in the weight of the bag and contents is within an expected weight range for each added purchase item. Thus if a customer scanned a purchase item with an expected weight range of four hundred and ninety nine to five hundred and one grams (499-501 g) and the scale measured a weight increase of five hundred grams (500 g) when the purchase item is placed in the bag, the self-checkout system may verify the identity of the purchase item. However, if in this example the scale measures a weight increase of six hundred grams (600 g) when the purchase is placed in the bag, the self-checkout system may notify store personnel to intervene and manually verify the identity of the purchase item.

The security scale platter must have the capacity to measure the weight of a bag full or nearly full of potentially heavy of purchase items. Unfortunately, the security scale platter may therefore lack the resolution to distinguish purchase items with difficult to distinguish characteristics such as a light-weight purchase item. For example, the customer may scan a light-weight purchase item such as a drill bit and place the drill bit in the bag. The security scale platter may be unable to distinguish the drill bit, and the self-checkout system may notify store personnel to intervene. As a result, the customer is delayed in checking out. In addition, more store personnel on average may be required to monitor the self-checkout systems more frequently, reducing the effectiveness of the self-checkout systems.

Some self-checkout systems have reduced interventions for light-weight purchase items by not verifying the light-weight purchase items using the security scale platter. However, not verifying all purchase items may allow customers to fraudulently or unintentionally take some purchase items without being charged.

Not verifying light-weight purchase items may also undermine the security philosophy of the self-checkout system by not verifying each purchase item. Some customers may be more likely to fraudulently avoid paying for some purchase items if they learned that not all purchase items were verified. Other customers may attempt to avoid payment for light-weight purchase items simply to see if the self-checkout system could be fooled.

From the foregoing discussion, it should be apparent that a need exists for an apparatus, system, and method that measure light-weight purchase items. Beneficially, such an apparatus, system, and method would allow a self-checkout system to verify the identity of light-weight purchase items, even when the light-weight purchase items are purchased with significantly heavier items.

SUMMARY OF THE INVENTION

The present invention has been developed in response to the present state of the art, and in particular, in response to the problems and needs in the art that have not yet been fully solved by currently available self-checkout systems. Accordingly, the present invention has been developed to provide an apparatus, system, and method for measuring purchase items that overcome many or all of the above-discussed shortcomings in the art.

The apparatus to measure purchase items is provided with a plurality of modules configured to functionally execute the steps of identifying a purchase item conforming to specified characteristics, directing a customer to place the purchase item in an auxiliary receptacle, and measuring a parameter for the purchase item. These modules in the described embodiments include an identification module, a communication module, and a measurement module. The apparatus may further include a verification module and a notification module.

The identification module identifies a purchase item. In one embodiment, the identification module identifies the purchase item conforming to a specified characteristic. The specified characteristic may be configured as a weight range of the purchase item. In a certain embodiment, the specified characteristic weight range may be in the range of 1 to 100 grams.

The communication module directs a customer to place the purchase item in an auxiliary receptacle if the purchase item conforms to the specified characteristic. In a certain embodiment the communication module audibly directs the customer to place the purchase item in the auxiliary receptacle. Alternatively the communication module displays a message directing the customer to place the purchase item in the auxiliary receptacle.

The measurement module measures a parameter for the purchase item when the purchase item is placed in the auxiliary receptacle. The measured parameter may be configured as a weight of the purchase item. In a certain embodiment, parameter measurement is through a scale. In one embodiment, the scale is a digital scale. In an embodiment, the scale is disposed on a security platter such that a security platter weighs the scale. The auxiliary receptacle may include a bag disposed so as to be weighed by the scale. In an alternative embodiment, the auxiliary receptacle is a surface of the scale.

In one embodiment, the verification module verifies the measured parameter. In an embodiment, the verification module verifies that the measured parameter is substantially equivalent to an expected parameter for the purchase item. The expected parameter may be configured as a weight range for the purchase item.

The notification module may communicate a security notification. In an embodiment, the notification module communicates the security notification to store personnel in the response to the measured parameter not being substantially equivalent to the expected parameter.

A system of the present invention is also presented to verify purchase items. The system may be embodied in a self-checkout system. The system includes an identification module, a security platter, an auxiliary receptacle, a communication module, a measurement module, and a verification module. In particular, the system, in one embodiment, includes a notification module.

The security platter cumulatively weighs purchase items. The identification module identifies a purchase item conforming to a specified characteristic. The communication module directs a customer to place the purchase item in the auxiliary receptacle if the purchase item conforms to the specified characteristics. In a certain embodiment, the auxiliary receptacle is disposed on the security platter.

The measurement module measures a parameter for the purchase item when the purchase item is placed in the auxiliary receptacle. The verification module may verify the measured parameter is substantially equivalent to an expected parameter for the purchase item. The expected parameter may be configured as a weight range of the purchase item. In one embodiment, the notification module communicates the security notification if the measured parameter is not substantially equivalent to the expected parameter.

A method of the present invention is also presented for verifying a light-weight purchase item. The method in the disclosed embodiments substantially includes the steps to carry out the functions presented above with respect to the operation of the described apparatus and system. In one embodiment the method includes identifying a purchase item, directing a customer to place the purchase item in an auxiliary receptacle, and measuring a parameter for the purchase item. The method also may include verifying the measured parameter and communicating a security notification.

An identification module identifies a purchase item. In one embodiment, the identification module receives the identification of the purchase item from a self-checkout system. The communication module directs the customer to place the purchase item in an auxiliary receptacle if the purchase item conforms to a specified characteristic. A measurement module measures a parameter of the purchase item.

A verification module may verify the measured parameter. In one embodiment, the verification module verifies that the measured parameter is substantially equivalent to an expected parameter for the purchase item. In a certain embodiment, a notification module communicates a security notification if the measured parameter is not substantially equivalent to the expected parameter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, system, and method that measures light-weight purchase items. Beneficially, such an apparatus, system, and method would allow a self-checkout system to verify the identity of light-weight purchase items, even when the light-weight purchase items were purchased with significantly heavier items. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
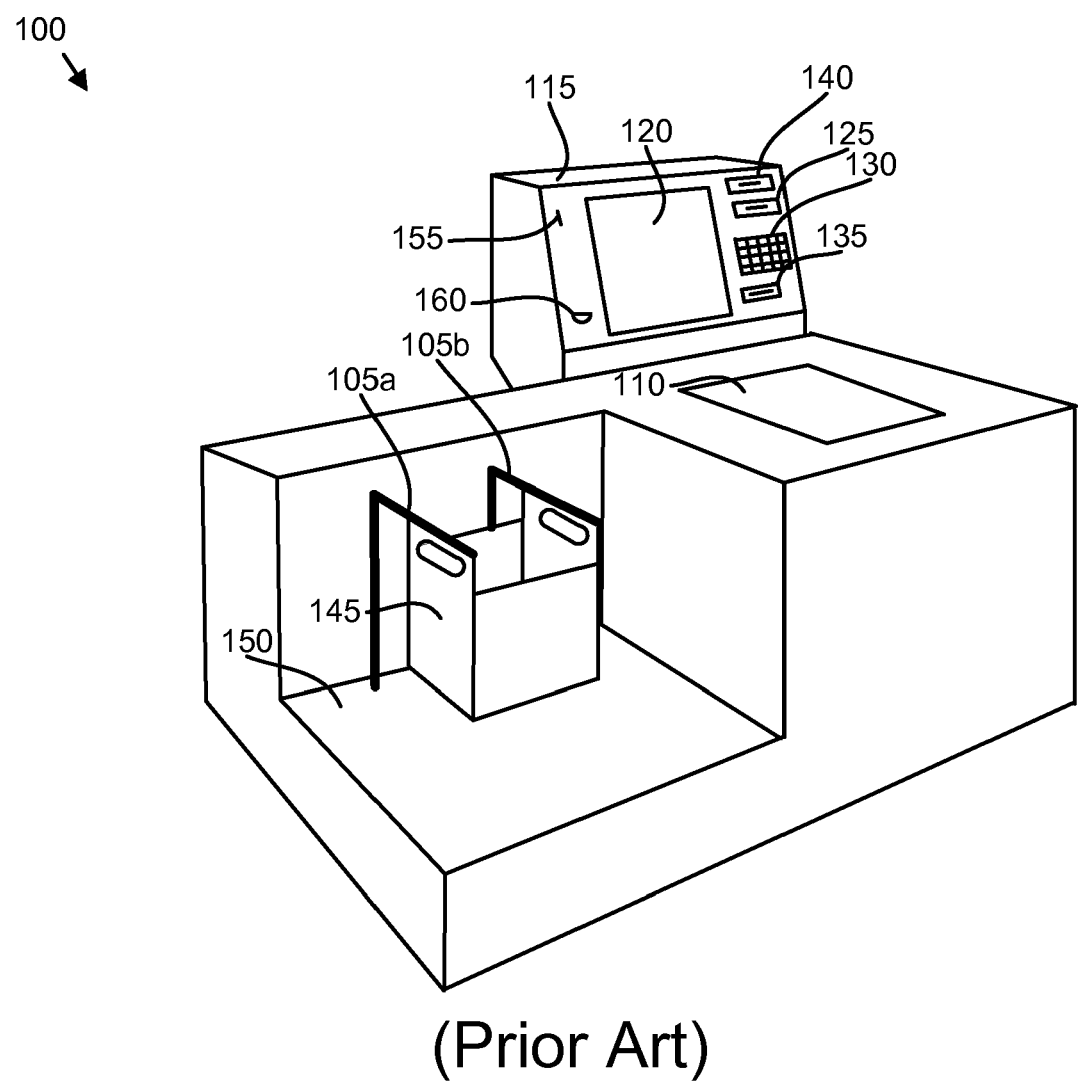
FIG. 1 is a perspective diagram illustrating one embodiment of self-checkout system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a perspective diagram illustrating one embodiment of a self-checkout system 100. The system 100 includes one or more bag supports 105, a user interface 115, a scanner 110, a bag 145 and a security scale platter 150. The user interface 115 includes a display 120, a cash receptacle 125, a keypad 130, a printer 135, a bankcard receptacle 140, a coin acceptor 155, and a coin dispenser 160. The user interface 115 may also include additional elements for completing transactions with a customer.

A customer scans each purchase item with the scanner 110 and places the purchase item in the bag 145 supported by the bag holders 105. The bag 145 is disposed on the security scale platter 150. The scanner 110 may be configured as a bar code scanner, a RFID scanner, and the like known in the art. Alternatively, the scanner 110 may be a vision system that captures visual characteristics of the purchase item as described above for identification of the purchase items.

The system 100 may calculate a total purchase cost for the purchase items and display the total purchase cost on the display 120. The customer may accept the total purchase cost using a key of the keypad 130. Alternatively, the display 120 may be configured as a touch display and the customer may accept the total purchase cost using a touch key of the display 120. The customer may complete the transaction by tendering a cash payment through the cash receptacle 125 and/or by tendering a bank card such as a credit card, a debit card, a cash card, a gift card, or the like at the bank card receptacle 135. The display 120 may also receive a customer signature. The customer may also tender coins through the coin acceptor 155. In addition, the customer may receive coins as change through the coin dispenser 160. The system 100 may also print a receipt for the customer using the printer 135.

In one embodiment, the security scale platter 150 weighs the purchase items in the bag 145. For example, the security scale platter 150 may determine a cumulative weight for the purchase items in the bag 145. The system 100 may calculate a weight for each purchase item from two or more cumulative weights of purchase items in the bag 145. For example, the security scale platter 150 may weigh the bag 145 at a first instance. The customer may then scan a first purchase item and place the first purchase item in the bag 145. The security scale platter 150 may then weigh the purchase items in the bag at a second instance. The system 100 may determine the weight of the first purchase item as the weight of the bag 145 at the second instance minus the weight of the bag 145 at the first instance.

The system 100 may verify a purchase item using the weight of the purchase item. For example, if the system 100 determines that a purchase item has a weight of five hundred grams (500 g), but also determines that the purchase item should have a weight of seven hundred grams (700 g), the system 100 may notify store personnel of the discrepancy.

Unfortunately, the security scale platter 150 may not have sufficient resolution to verify some light-weight purchase items. For example, the customer may scan a light-weight purchase item such as a drill bit and place the drill bit in the bag 145. The security scale platter 150 may be unable to distinguish the drill bit, and the self-checkout system 100 may notify store personnel to intervene. The present invention measures light-weight purchase item and may verify the light-weight purchase items as will be described hereafter.

Figure 2:
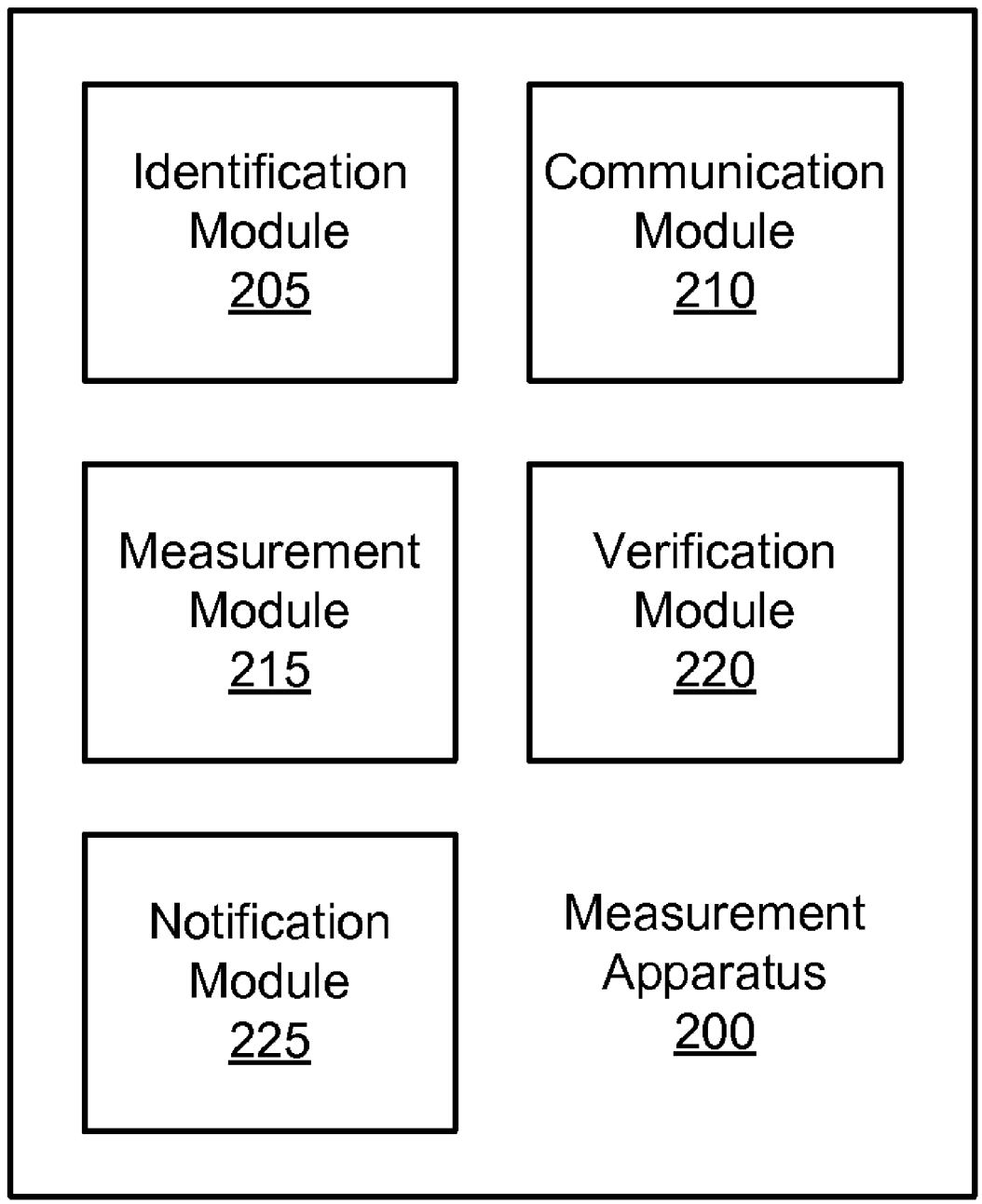
FIG. 2 is a schematic block diagram illustrating one embodiment of a measurement apparatus of the present invention.

FIG. 2 is a block diagram illustrating one embodiment of a measuring apparatus 200 of the present invention. The apparatus 200 measures a parameter of a purchase item and can be embodied in the self-checkout system 100 of FIG. 1. The description of the apparatus 200 refers to elements of FIG. 1, like numbers referring to like elements. The apparatus 200 includes an identification module 205, a communication module 210, a measurement module 215, a verification module, and a notification module 225.

The identification module 205 identifies a purchase item. In one embodiment, the identification module 205 identifies that the purchase item conforms to a specified characteristic. For an example, the specified characteristic may be a weight range for the purchase item.

In one embodiment, the identification module 205 comprises the scanner 110 of FIG. 1 in conjunction with one or more software processes for a Lane PC and a central store data processing system. The scanner 110 may scan a barcode label, RFID tag, or the like to identify the purchase item. Alternatively, the identification module 205 may receive an identification of the purchase item from another device.

If the purchase item conforms to the specified characteristic, the communication module 210 directs the customer to place the purchase item in an auxiliary receptacle. For example, the communication module 210 may audibly direct the customer to place the purchase item in the auxiliary receptacle. In one example, the communication module 210 may issue the audible command "Please place the item in the small bag" wherein the phrase "small bag" refers to the auxiliary receptacle.

The audible direction may be accompanied by a flashing of a light in proximity to the auxiliary receptacle. Alternatively the communication module 210 displays a message on the display 120 directing the customer to place the purchase item in the auxiliary receptacle. For example, the communication module 210 may display a message "Please place the item in the bag near the flashing light."

When the purchase item is placed in the auxiliary receptacle, the measurement module 215 measures a parameter for the purchase item. For an example, the measured parameter may be a weight of the purchase item. In a certain embodiment, a scale measures the parameter. In one embodiment, the scale is a digital scale. Alternatively, the parameter may be a color signature, a volume profile, or the like.

In one embodiment, the verification module 220 verifies the measured parameter. For an example, the verification module 220 may verify that the measured parameter is substantially equivalent to an expected parameter for the purchase item. The expected parameter may be configured as a weight range of the purchase item. In a certain embodiment the expected parameter weight range may be in the range of ninety-five percent to one hundred and five percent (95-105%) of the average weight of the purchase item. Alternatively, the expected parameter may be a weight range of ninety-eight percent to one hundred and two percent (98%-102%) of the average weight of the purchase item. The verification module 220 may notify the Lane PC and/or central store data processing system that the purchase item is verified.

The notification module 225 may communicate a security notification. For example, the notification module 225 may communicate a security notification to store personnel in the response to the measured parameter not being substantially equivalent to the expected parameter.

In one embodiment, the notification module 225 communicates the security notification through a network such as a local area network, a wireless network, or the like. Store personnel may receive the security notification at a workstation, register, or the like. Alternatively, the notification module 225 may communicate the security notification audibly, such as by using an encoded series of tones. The notification module 225 may also communicate the security notification visual using one or more lights.

Figure 3:
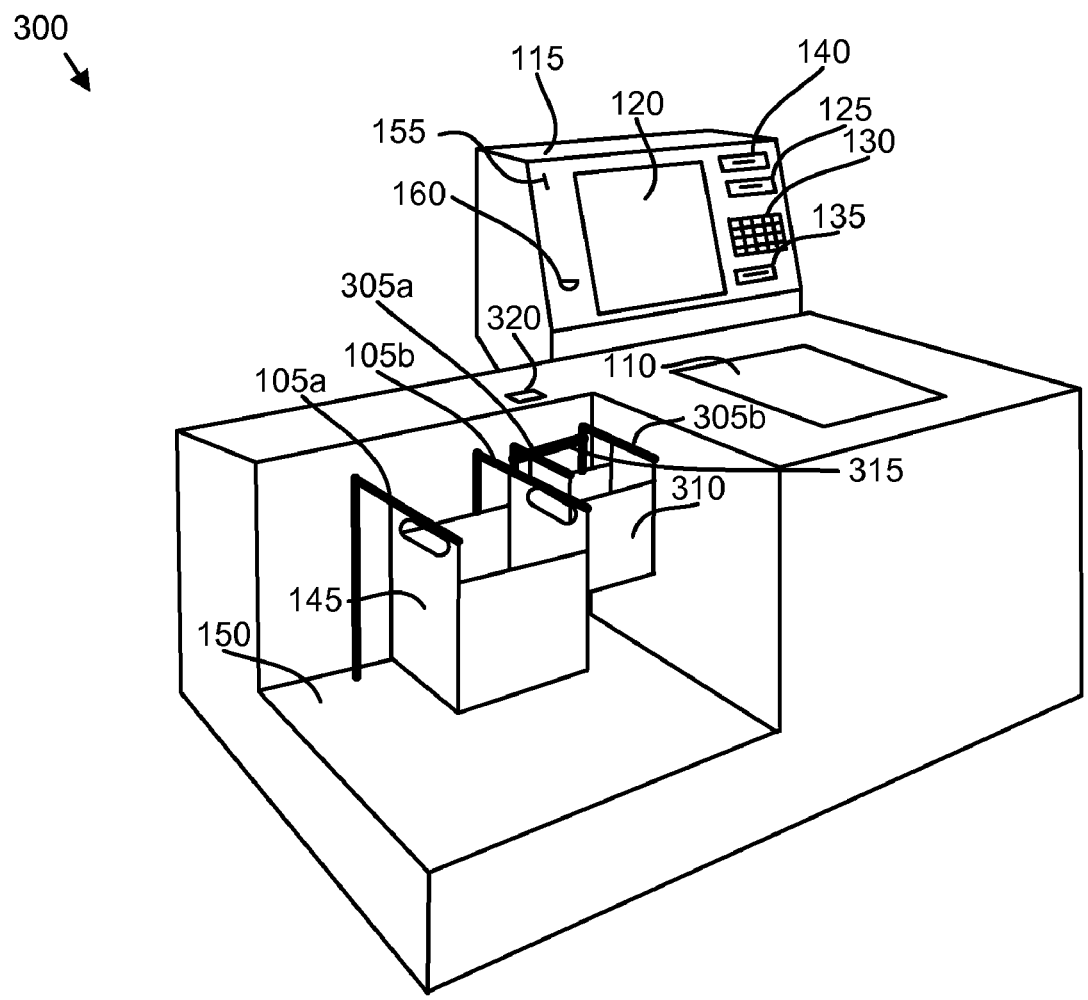
FIG. 3 is a schematic block diagram illustrating one embodiment of self-checkout system for measuring a light-weight purchase item in accordance with the present invention.

FIG. 3 is a schematic block diagram illustrating one embodiment of self-checkout system 300 for measuring light-weight purchase items in accordance with the present invention. The system 300 embodies the elements of FIG. 2 to measure purchase items for the self-checkout system 100 of FIG. 1. In addition, the system 300 refers to elements of FIGS. 1-2, like numbers referring to like elements.

The system 300 includes one or more bag supports 105, one or more auxiliary receptacle supports 305, an auxiliary receptacle 310, an auxiliary receptacle scale 315, an identifier light 320, a user interface 115, a scanner 110, a bag 145 and a security scale platter 150. The user interface 115 includes a display 120, a cash receptacle 125, a keypad 130, and a bankcard receptacle 135. The user interface 115 may also include additional elements for completing transactions with a customer. In the depicted embodiment, the auxiliary receptacle 310 is depicted as a bag. However, the auxiliary receptacle 310 may be configured in other forms.

In one embodiment, the auxiliary receptacle 310 is in physical communication with the security scale platter 150 through the auxiliary receptacle supports 305. The security scale platter 150 may weigh the auxiliary receptacle 310 and any purchase items placed therein along with purchase items placed in the bag 310. Thus, if the customer inadvertently places a heavier purchase item in the auxiliary receptacle 310 although the communication module 210 has not directed the customer to do so, the security scale platter 150 still correctly determines the weight of the heavier purchase item.

The identification module 205 may use the scanner 110 to identify a purchase item. If the identification module 205 identifies the purchase item as conforming to a specified characteristic such as light-weight, the communication module 210 directs the customer to place the purchase item in an auxiliary receptacle 310.

In one embodiment, the identifier light 320 indicates the auxiliary receptacle 310 to the customers. For example, the communication module 210 may identify the auxiliary receptacle 310 to the customer by referencing the identifier light 320.

In one embodiment, the auxiliary receptacle 310 is in communication with the auxiliary receptacle scale 315. The auxiliary receptacle scale 315 may be a sensitive digital scale. The digital scale may be able to accurately weight purchase items in the range of one to 100 grams (1-100 g) to within one tenth of a gram (0.1 g).

Figure 4:
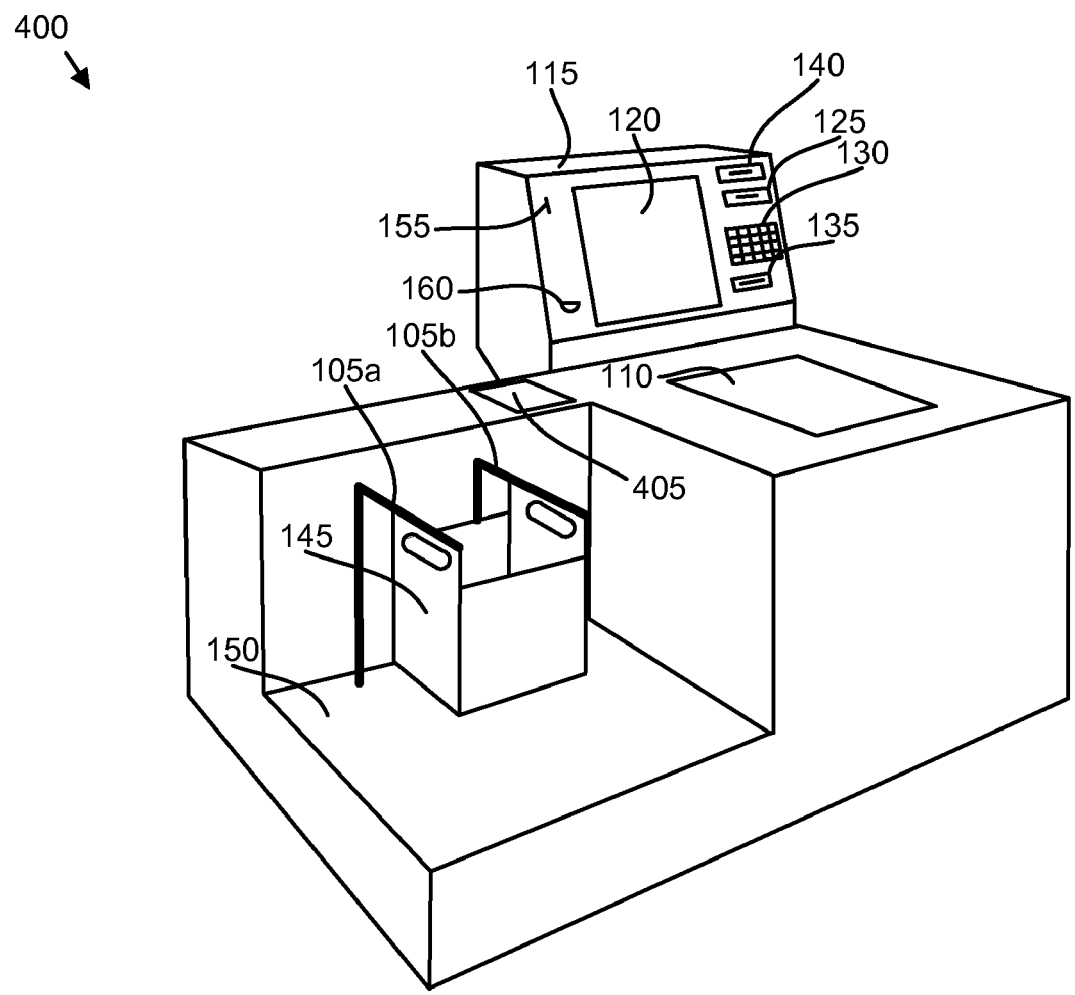
FIG. 4 is a perspective drawing illustrating one embodiment of a self-checkout systems with an auxiliary receptacle surface.

FIG. 4 is a schematic block diagram illustrating one embodiment of self-checkout system 400 for measuring light-weight purchase items in accordance with the present invention. The system 400 embodies the elements of FIG. 2-3 to measure purchase items for the self-checkout system 100 of FIG. 1. In addition, the system 400 refers to elements of FIGS. 1-3, like numbers referring to like elements.

In the depicted embodiment, the auxiliary receptacle may be configured as auxiliary receptacle surface 405. In one embodiment, the communication module 210 directs the customer to place the purchase item on the auxiliary receptacle surface 405. The auxiliary receptacle surface 405 may be operably connected to a scale. The scale may be configured as a digital scale. The scale may weigh each purchase item placed on the auxiliary receptacle 405. The verification module 220 may verify the measured parameter for the purchase item. In addition, the communication module 210 may further direct the customer to remove the verified purchase item from the auxiliary receptacle surface 405 and place the verified purchase item in the bag 145.

In one embodiment, the auxiliary receptacle surface 405 includes a light (not shown) within the auxiliary receptacle surface 405 that indicates the location of the auxiliary receptacle surface 405. The communication module 210 may illuminate the light to indicate the auxiliary receptacle surface 405 to the customer.

Figure 5:
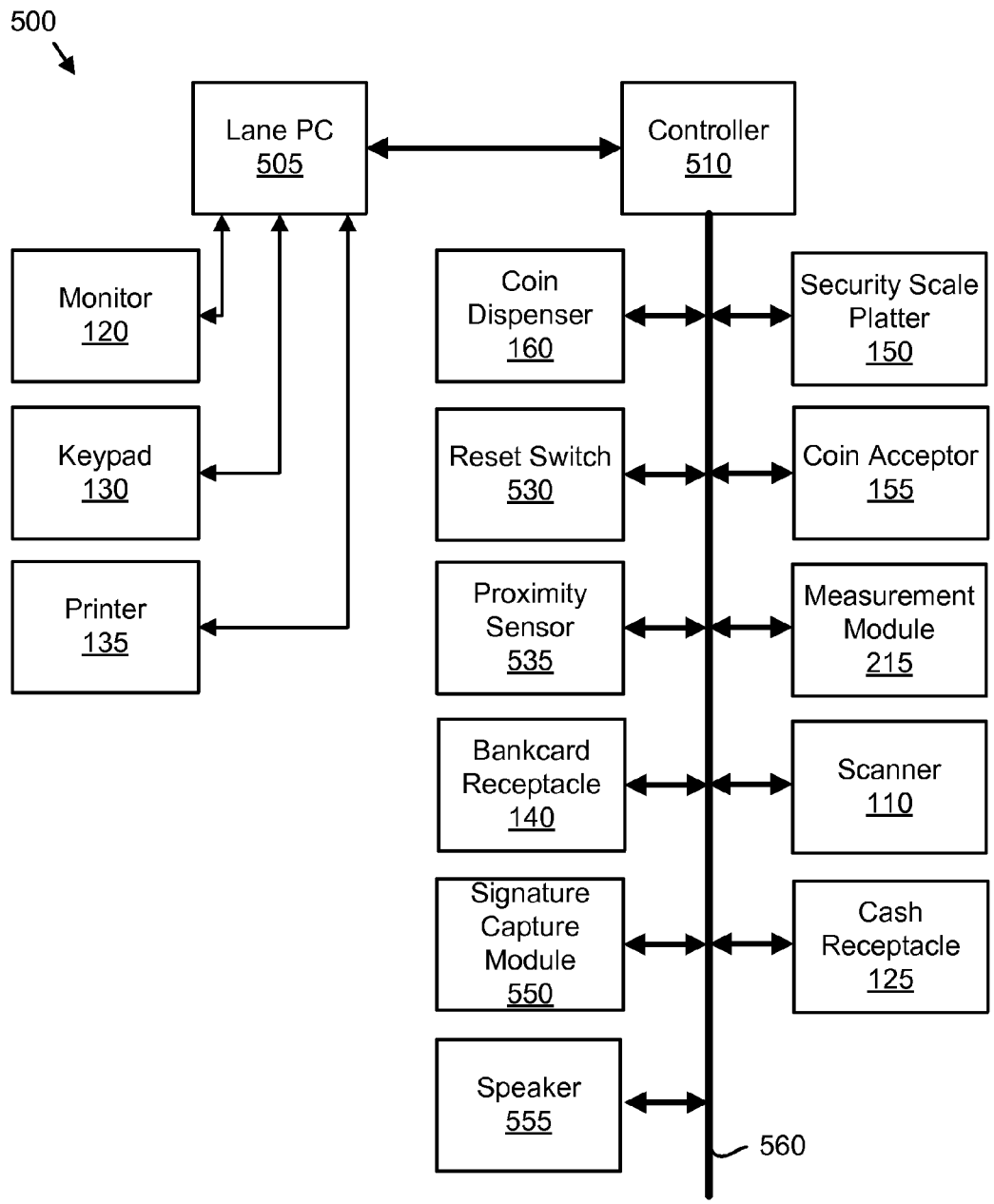
FIG. 5 is a schematic block diagram illustrating one embodiment of a measuring system of the present invention.

FIG. 5 is a schematic block diagram illustrating one embodiment of a measuring system 500 of the present invention. The description of the system 500 refers to elements of FIGS. 1-4, like numbers referring to like elements. The system 500 includes a Lane PC 505 and a controller 510.

The Lane PC 505 may be a personal computer as is well known to those of skill in the art. The Lane PC 505 may communicate with the monitor 120, keypad 130, and printer 135. The Lane PC 505 also communicates with the controller 510 through a communications channel such as a serial connection, a data bus, or the like.

In one embodiment, the controller 510 is configured to communicate with a plurality of electronic devices. The controller 510 may communicate with the electronic devices through a shared data bus 560 as shown, or through dedicated data buses, analog channels, and the like. The controller 510 may also include a processor and a memory to store and execute software processes. In one embodiment, the Lance PC 505 and the controller 510 singly and/or collectively execute one or more software processes comprising in whole or in part the identification module 205, communication module 210, verification module 220, and notification module 225.

The controller 510 may communicate with the coin dispenser 160, bankcard receptacle 140, security scale platter 150, coin accepter 155, measurement module 215, scanner 110, and cash receptacle 125. In addition, the controller 510 is shown in communication with a reset switch 530, proximity sensor 535, signature capture module 550, and speaker 555.

In one embodiment, the controller 510 controls the function of the coin dispenser 160, bankcard receptacle 140, security scale platter 150, coin accepter 155, measurement module 215, scanner 110, cash receptacle 125, speaker 555, and signature capture module 550. The controller 510 may also receive inputs from the coin dispenser 160, bankcard receptacle 140, security scale platter 150, coin accepter 155, measurement module 215, scanner 110, cash receptacle 125, reset switch 530, proximity sensor 535, and signature capture module 550.

The reset switch 530 may be configured to reset the system 500. The proximity sensor 535 may determine a customer is standing near the self-checkout system 300, 400. The signature capture module 550 may capture a customer signature as is well known to those of skill in the art. In one embodiment, the signature capture module 550 captures the customer signature through the display 120. Alternatively, the signature capture module 550 may be a discrete device. The speaker 555 may communicate audible prompts and directions for the system 500. For example, the communication module 210 may direct the customer to place the purchase item in the auxiliary receptacle 310 using the speaker 555.

In one embodiment, the measurement module 215 includes the auxiliary receptacle scale 315. The measurement module 315 may weigh the purchase item using the auxiliary receptacle scale 315 and report the weight to the controller 510. Alternatively, the measurement module 315 may include the scale of the auxiliary receptacle surface 405.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
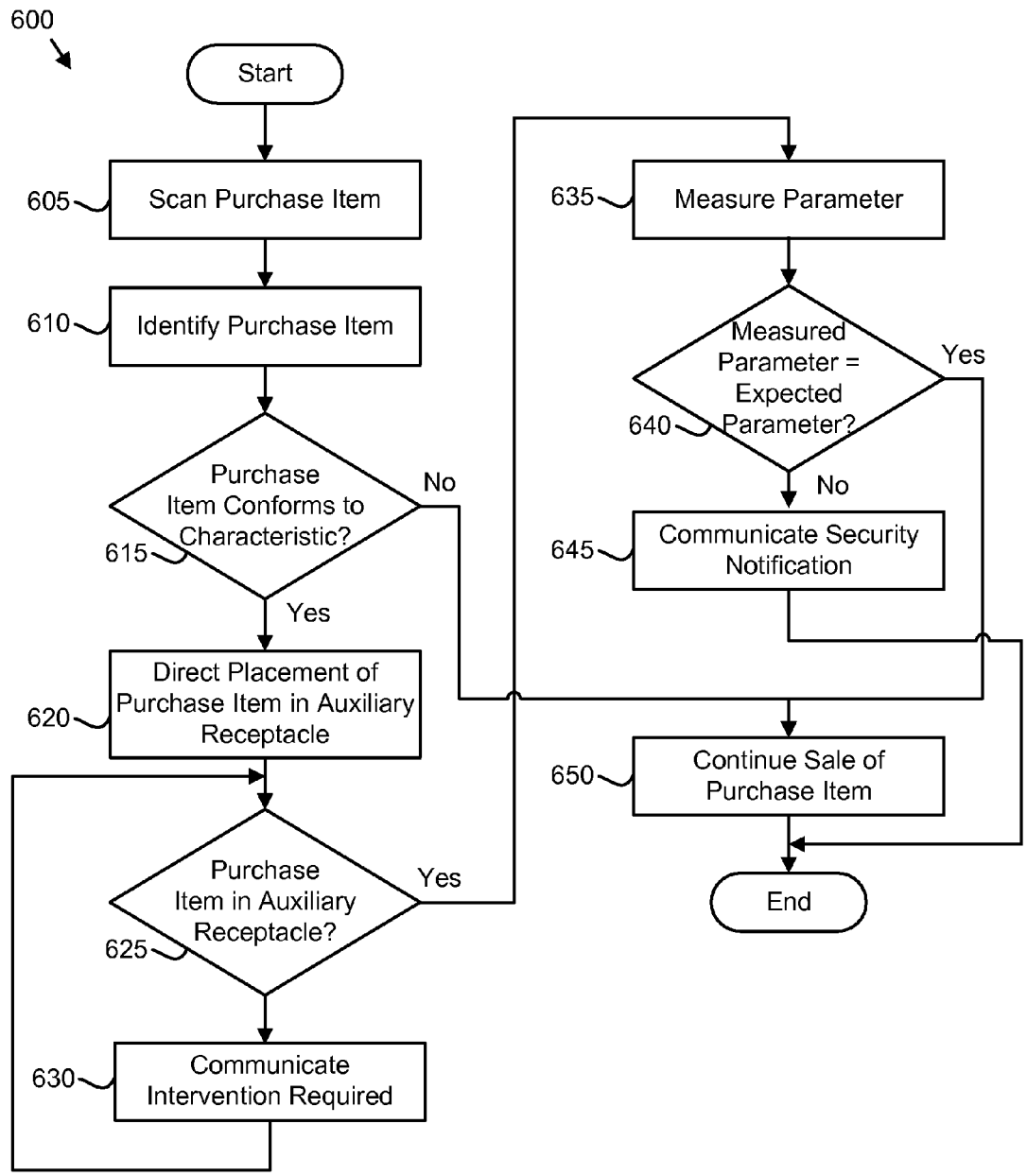
FIG. 6 is a schematic flow chart diagram illustrating one embodiment of measuring method in accordance with the present invention.

FIG. 6 is a schematic flow chart diagram illustrating one embodiment of a measuring method 600 in accordance with the present invention. The method 600 substantially includes the steps to carry out the functions presented above with respect to the operation of the described apparatus 200 of FIG. 2 and system 100, 300, 400, 500 of FIGS. 1, 3, 4, and 5 respectively. The description of the method 600 refers to elements of FIGS. 1-5, like numbers referring to like elements.

The method 600 begins, and in one embodiment, the scanner 110 scans 605 the purchase item. In a certain embodiment, the scanner 110 scans 605 a barcode affixed to the purchase item and retrieves an identifying code for the purchase item. Alternatively, the scanner 110 may read an RFID tag affixed to the purchase item and retrieve the identifying code from the RFID tag.

In one embodiment, the identification module 205 uses the identifying code as a key to access a record for the purchase item from a database. The record may include characteristics of the purchase item such as weight, size, color, color profile, dimensions, volume, echo signature, and the like. The record may also include a name and/or description for the purchase item. The identification module 205 further determines 615 that the purchase items conform to a specified characteristic. If the identification module 205 determines 615 that the purchase item does not conform to specified characteristic, the identification module 205 continues 650 the sale of the purchase item and the method 600 terminates. In one embodiment, the identification module 205 yields control to a Lane PC software process to complete the processing of the purchase item.

If the identification module 205 determines 615 that the purchase item conforms to the specified characteristic, the communication module 210 directs 620 the customer to place the purchase item in the auxiliary receptacle 310. The communication module 210 may use the name and/or description of the purchase item in directing the customer. For example, the communication module 210 may audibly direct the customer to place the purchase item in the auxiliary receptacle 310 using a common name for the purchase item.

In one example, the communication module 210 may issue the audible command "Place the drill bit in the bag by the flashing light." wherein the phrase "small bag" refers to the auxiliary receptacle 310 and the "flashing light" refers to the identifier light 320. The identifier light 320 may be of a fixed color and/or of changing colors and may flash at fixed and/or variable intervals of time.

Alternatively the communication module 210 displays a message on the display 120 directing the customer to place the purchase item in the auxiliary receptacle 310. For example, the communication module 210 may display a message "Please place the drill bit in the bag with the flashing light."

In one embodiment, the controller 510 determines 625 if the customer placed the purchase item in the auxiliary receptacle 310. If the controller 510 determines 625 that the purchase item is not in the auxiliary receptacle 310, the communication module 210 communicates 630 a request for intervention. For example, the communication module 210 may communicate an audible notification to the customer, "Please place the item in the small bag." Alternatively the communication module 210 may communicate 630 the same message on the display 120.

In another embodiment, the communication module 210 communicates 630 a request to store personnel for an intervention. For example, the communication module 210 may communicate a visual security notification to the store personnel using the identifier light 320.

If the controller 510 determines 625 that the purchase item is in the auxiliary receptacle 310, the measurement module 215 measures 635 a parameter of the purchase item. In one embodiment the measured parameter may be configured as the weight for the purchase item. In a certain embodiment, a scale measures the parameter. In the depicted embodiment, the scale is a digital scale. In a certain embodiment, the measurement module 215 captures a color profile for the purchase item using a vision system.

The verification module 220 determines 640 if the measured parameter is substantially equivalency to an expected parameter. For an example, the verification module 220 may verify 640 that a measured parameter of sixty-five grams (65 g) is substantially equivalent to an expected parameter of a weight of sixty-four to sixty-six grams (64-66 g) for the purchase item. The expected parameter may be configured as a weight range, size, color, color profile, dimensions, volume, and the like of the purchase item. In a certain embodiment the expected parameter weight range may be in the range of ninety-five percent to one hundred and five percent (95-105%) of the purchase item's expected weight.

If the verification module 220 determines 640 that the measured parameter is not substantially equivalent to the expected parameter, the communication module 210 communicates 645 a security notification. In one embodiment, the security notification is a request for an intervention. For example the communication module 210 may issue the security notification "Verify the drill bit on station 4" to a display monitored by store personnel.

If the verification module 220 determines 640 that the measured parameter is substantially equivalent to the expected parameter, the verification module 220 continues 650 the sale of the purchase item, allowing the customer to purchase the purchase item, and the method 600 terminates. In a certain embodiment, the verification module 220 yields control to the Lane PC software process to complete the processing of the purchase item. In one embodiment, the method 600 loops to scan 605 another purchase item.

The method 600 allows a separate, more precise measurement 635 of a parameter of purchase items conforming to a specified characteristic such as light-weight purchase items. Thus, purchase items that a self-checkout system 100 would have been unable to measure and verify in the past, can now be measured and verified. The method 600 allows self-checkout systems 100 to employ a consistent security strategy of verifying each purchase item, discouraging customers from defrauding the systems 100.

The present invention provides an apparatus, system, and method that measures light-weight purchase items. Beneficially, such an apparatus, system, and method would all a self-checkout system to verify the identity of light-weight purchase items, even when the light-weight purchase items were purchased with significantly heavier items.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to measure purchase items, the apparatus comprising:

an identification module that identifies a purchase item conforming to a specified characteristic;

a communication module that directs a customer to place the purchase item in an auxiliary receptacle in response to the purchase item conforming to the specified characteristic;

a measurement module that measures a parameter for the purchase item when placed in the auxiliary receptacle, wherein the measurement module measures the parameter of the purchase item using an auxiliary measuring device in response to the purchase item conforming to the specified characteristic and wherein a primary measuring device measures a parameter for the purchase item in response to the purchase item not conforming to the specified characteristic, wherein the auxiliary measuring device measures the parameter for the purchase item with a measurement system that is different than a measurement system used by the primary measuring device; and a verification module that verifies that the measured parameter for the purchase item, measured by the auxiliary measuring device in response to the purchase item conforming to the specified characteristic and measured by the primary measuring device in response to the purchase item not conforming to the specified characteristic, is substantially equivalent to an expected parameter for the purchase item.

2. The apparatus of claim 1, wherein the measurement system of the auxiliary measuring device is capable of measuring the parameter of the purchase item with a different precision than a precision of the measurement system used by the primary measuring device.

3. The apparatus of claim 1, further comprising a notification module that communicates a security notification in response to the measured parameter not being substantially equivalent to the expected parameter.

4. The apparatus of claim 1, wherein at least one of the auxiliary measuring device and the primary measuring device comprises a scale that measures weight.

5. The apparatus of claim 4, wherein both the auxiliary measuring device and the primary measuring device comprise scales that measure weight and wherein the expected parameter is an expected weight, wherein a weight of an item weighed by the auxiliary measuring device is added to a weight of an item measured by the primary measuring device to produce a cumulative weight, wherein the verification module at least partially verifies the measured parameter for a purchase item by comparing an increase in the cumulative weight with the expected weight for the purchase item.

6. The apparatus of claim 4, wherein the specified characteristic is configured as a weight range, the measured parameter is configured as a weight, and the expected parameter is configured as a weight range.

7. The apparatus of claim 6, wherein the specified characteristic weight range is in the range of 1 to 100 grams.

8. The apparatus of claim 4, wherein the auxiliary measuring device comprises a scale and wherein the auxiliary receptacle is configured as a bag disposed so as to be weighed by the auxiliary measuring device.

9. The apparatus of claim 1, wherein the specified characteristic comprises a weight range and wherein the primary measuring device lacks sufficient precision to distinguish a purchase item having a weight falling within the weight range, the auxiliary measuring device having a sufficient precision to distinguish a purchase item having a weight falling within the weight range.

10. The apparatus of claim 1, wherein the auxiliary receptacle is configured as surface that is substantially flat.

11. A computer program product comprising a computer useable medium having a computer readable program, wherein the computer readable program when executed on a computer causes the computer to:

identify a purchase item conforming to a specified characteristic;

direct a customer to place the purchase item in an auxiliary receptacle in response to the purchase item conforming to the specified characteristic;

measure a parameter for the purchase item when placed in the auxiliary receptacle, wherein the parameter of the purchase item is measured using an auxiliary measuring device in response to the purchase item conforming to the specified characteristic and wherein a primary measuring device measures a parameter for the purchase item in response to the purchase item not conforming to the specified characteristic, wherein the auxiliary measuring device measures the parameter for the purchase item with a measurement system that is different than a measurement system used by the primary measuring device; and verify that the measured parameter for the purchase item, measured by the auxiliary measuring device in response to the purchase item conforming to the specified characteristic and measured by the primary measuring device in response to the purchase item not conforming to the specified characteristic, is substantially equivalent to an expected parameter for the purchase item.

12. The computer program product of claim 11, wherein the measurement system of the auxiliary measuring device is capable of measuring the parameter of the purchase item with a different precision than a precision of the measurement system used by the primary measuring device.

13. The computer program product of claim 11, wherein the computer readable code further causes the computer to communicate a security notification in the response to the measured parameter not being substantially equivalent to the expected parameter.

14. The computer program product of claim 11, wherein the specified characteristic comprises a weight range and wherein the primary measuring device lacks sufficient precision to distinguish a purchase item having a weight falling within the weight range, the auxiliary measuring device having a sufficient precision to distinguish a purchase item having a weight falling within the weight range.

15. The computer program product of claim 14, wherein the expected parameter is configured as a weight range.

16. A system to verify purchase items, the system comprising:
an identification module that identifies a purchase item conforming to a specified characteristic;
a security platter that cumulatively weighs purchase items;
an auxiliary receptacle disposed on the security platter;
a communication module that directs a customer to place the purchase item in the auxiliary receptacle in response to the purchase item conforming to the specified characteristic;
a measurement module that measures a weight for the purchase item when placed in the auxiliary receptacle, wherein the measurement module measures the weight of the purchase item using an auxiliary measuring device in response to the purchase item conforming to the specified characteristic and wherein the security platter measures a weight for the purchase item in response to the purchase item not conforming to the specified characteristic, wherein the auxiliary measuring device is capable of measuring the weight of the purchase item with a different precision than a precision of the security platter; and a verification module configured to verify that the measured weight for the purchase item, measured by the auxiliary measuring device in response to the purchase item conforming to the specified characteristic and measured by the security platter in response to the purchase item not conforming to the specified characteristic, is substantially equivalent to an expected weight for the purchase item and to communicate a notification that the purchase item is verified.

17. The system of claim 16, further comprising a notification module configured to communicate a security notification in the response to the measured weight not being substantially equivalent to the expected weight.

18. The system of claim 16, wherein the specified characteristic comprises a weight range and wherein the security platter lacks sufficient precision to distinguish a purchase item having a weight falling within the weight range, the auxiliary measuring device having a sufficient precision to distinguish a purchase item having a weight falling within the weight range.

19. The system of claim 16, wherein the specified characteristic is configured as a weight range in the range of 1 to 100 grams.

20. A method for deploying computer infrastructure, comprising integrating computer-readable code into a computing system, wherein the code in combination with the computing system is capable of performing the following:
identifying a purchase item conforming to a specified characteristic;
directing a customer to place the purchase item in an auxiliary receptacle in response to the purchase item conforming to the specified characteristic;
measuring a parameter for the purchase item when placed in the auxiliary receptacle, wherein the parameter of the purchase item is measured using an auxiliary measuring device in response to the purchase item conforming to the specified characteristic and wherein a primary measuring device measures a parameter for the purchase item in response to the purchase item not conforming to the specified characteristic, wherein the auxiliary measuring device measures the parameter for the purchase item with a measurement system that is different than a measurement system used by the primary measuring device;
verifying that the measured parameter for the purchase item, measured by the auxiliary measuring device in response to the purchase item conforming to the specified characteristic and measured by the primary measuring device in response to the purchase item not conforming to the specified characteristic, is substantially equivalent to an expected parameter for the purchase item; and
communicating a security notification in the response to the measured parameter not being substantially equivalent to the expected parameter.

* * * * *